(12) United States Patent
Liu (10) Patent No.: US 10,339,356 B2
(45) Date of Patent: Jul. 2, 2019

(54) FINGERPRINT SENSOR

(71) Applicant: ILI TECHNOLOGY CORP., Hsinchu County (TW)

(72) Inventor: Tzu Wei Liu, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 85 days.

(21) Appl. No.: 15/497,716

(22) Filed: Apr. 26, 2017

(65) Prior Publication Data

US 2017/0337411 A1    Nov. 23, 2017

(30) Foreign Application Priority Data

May 19, 2016 (TW) .............................. 105115412 A (51) Int. Cl.
*G06K 9/28* (2006.01)
*G06K 9/00* (2006.01)

(52) U.S. Cl.
CPC ......... *G06K 9/0002* (2013.01); *G06K 9/0008* (2013.01)

(58) Field of Classification Search
CPC .................................................. G06K 9/0002
See application file for complete search history.

(56) References Cited

U.S. PATENT DOCUMENTS

| 7,738,681 | B1* | 6/2010 | Rannow | G06K 9/0002 382/124 |
|---|---|---|---|---|
| 2011/0102361 | A1* | 5/2011 | Philipp | G06F 3/044 345/174 |
| 2012/0262382 | A1* | 10/2012 | Guard | G06F 3/044 345/173 |
| 2014/0291008 | A1* | 10/2014 | Huang | H05K 1/0296 174/268 |
| 2015/0286312 | A1* | 10/2015 | Kang | G06F 3/044 345/174 |
| 2018/0173937 | A1* | 6/2018 | Russo | G06K 9/00114 |

FOREIGN PATENT DOCUMENTS

| CN | 203838717 | 9/2014 |
| CN | 204719728 | 10/2015 |
| CN | 105389552 | 3/2016 |
| CN | 205139872 | 4/2016 |
| TW | 201508567 | 3/2015 |

* cited by examiner

*Primary Examiner* — Brian Werner
(74) *Attorney, Agent, or Firm* — JCIPRNET (57) ABSTRACT

A fingerprint sensor includes a plurality of first touch electrode strips and a plurality of second touch electrode strips. The first touch electrode strips are arranged along a first direction, and the second touch electrode strips are arranged along a second direction different from first direction. The first touch electrode strips and the second touch electrode strips intersect to form a plurality of intersections. A maximum included angle is present at each of the intersections of the first touch electrode strips and the second touch electrode strips, and to maximum included angles corresponding to the same first touch electrode strip are different.

22 Claims, 9 Drawing Sheets

FINGERPRINT SENSOR

This application claims the benefit of Taiwan application Serial No. 105115412, filed May 19, 2016, the subject matter of which is incorporated herein by reference.

BACKGROUND OF THE INVENTION

Field of the Invention

The invention relates in general to a fingerprint sensor, and more particularly, to a capacitive fingerprint sensor comprising driving electrodes and sensing electrodes that intersect in a non-perpendicular manner.

Description of the Related Art

Methods for obtaining data are becoming more diversified as the technology continues progressing in the recent years, making the safekeeping of personal private data more and more challenging. In a conventional privacy protection method, a password is adopted for safeguarding. However, when a password is used for identity verification, not only the password may be easily leaked or cracked, but also a user may forget such password, thus again causing numerous inconveniences. In response, biological identification technologies have developed. Through unique human biological characteristics, e.g., fingerprints, irises or voices, the identify of a user can be verified. Regarding the above, fingerprint images are easy to acquire, and a multiplicity property is provided by all ten fingers that can be registered and verified. Further, a fingerprint sensor features advantages of being small in volume, high in performance and widely received by users. Therefore, fingerprint recognition has become highly valued and gradually applied in various consumer electronic products.

Among current fingerprint recognition technologies, a capacitive fingerprint sensor is most common as it may be integrated with an integrated circuit and readily packaged. A conventional capacitive fingerprint sensor is formed by strip-like driving electrodes and strip-like sensing electrodes, which intersect to form sensing units. A complete fingerprint image may be obtained through sensing ridges and valleys of fingerprints and capacitance changes of the sensing units.

In a conventional fingerprint sensor, the gap between every two adjacent driving electrodes is equal, and the gap between every two adjacent sensing electrodes is also equal—such is a most intuitive design. In fingerprint recognition, relative positions of characteristic points and angles of characteristic lines of fingerprints are generally compared with fingerprint images. If denser image information needs to be captured, a conventional fingerprint sensor is required to have an increased overall recognition resolution, since the conventional fingerprint sensor cannot capture even denser image information for specific areas of the fingerprints. In addition, to increase the overall recognition resolution, it is essential that gaps between driving electrodes and gaps between sensing electrodes be further reduced in a conventional fingerprint sensor. However, this design decreases coupling capacitance differences that the fingerprint sensor detects between ridges and valleys of fingerprints, such that the accuracy of a fingerprint image detected is lowered.

SUMMARY OF THE INVENTION

The invention is directed to a fingerprint sensor for obtaining denser fingerprint image information for different areas of a fingerprint or enhancing the accuracy of fingerprint detection.

According to an embodiment of the present invention, a fingerprint sensor has a central region and a border region. The fingerprint sensor includes a plurality of first touch electrode strips and a plurality of second touch electrode strips. The first touch electrode strips are sequentially arranged along a first direction. The second touch electrode strips are sequentially arranged along a second direction different from the first direction. The first touch electrode strips and the second touch electrode strips intersect to form a plurality of intersections. A maximum included angle is present at each of the intersections of the first touch electrode strips and the second touch electrode strips, and two maximum included angles, which correspond to the same first touch electrode strip and are respectively located in the central region and the border region, are different.

DETAILED DESCRIPTION OF THE INVENTION

The aspects and effects of the invention will become better understood to one person skilled in the art with regard to the following detailed description of the preferred but non-limiting embodiments. The following description is made with reference to the accompanying drawings.

Figure 1:
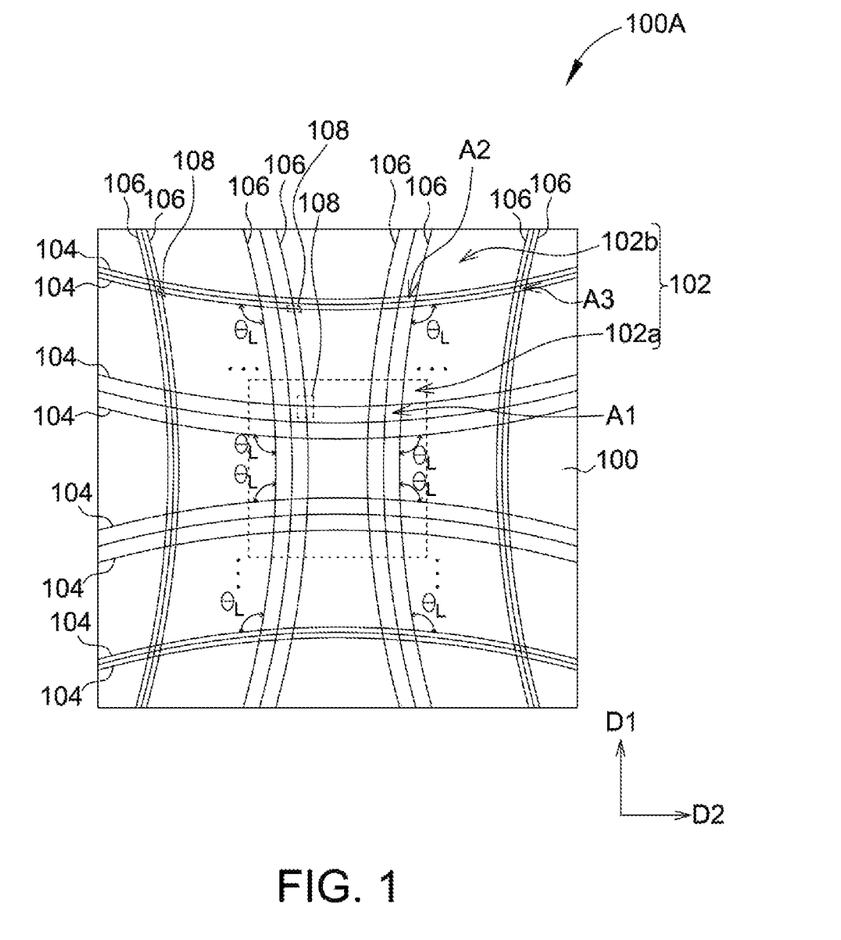
FIG. 1 is a top view of a fingerprint sensor according to a first embodiment of the present invention.

FIG. 1 shows a top view of a fingerprint sensor according to a first embodiment of the present invention. As shown in FIG. 1, a fingerprint sensor 100A has a fingerprint recognition area 102, which may include a central region 102a and a border region 102b. In this embodiment, for example, the border region 102b surrounds the central region 102a. Alternatively, the border region 102b of the present invention may be disposed on at least one side of the central region 102a. Further, the fingerprint sensor 100A includes a plurality of first touch electrode strips 104 and a plurality of second touch electrode strips 106. The first touch electrode strips 104 are sequentially arranged along a first direction D1. The second touch electrode strips 106 are sequentially arranged along a second direction D2, which is different from the first direction D1. The first touch electrode strips 104 and the second touch electrode strips 106 intersect to form a plurality of intersections. For example, the first direction D1 and the second direction D2 may respectively be the y-axis and the x-axis, or vice versa. A maximum included angle $\theta_L$ is present at each of the intersections of the first touch electrode strips 104 and the second touch electrode strips 106, and two maximum included angles $\theta_L$ corresponding to the same first touch electrode strip 104 are different. Preferably, these two maximum included angles $\theta_L$ are located within the central region 102a and the border region 102b, respectively. In other words, a first area A1 surrounded by two adjacent first touch electrode strips 104 and two adjacent second touch electrode strips 106 in the central region 102a is not equal to a second area A2 surrounded by two adjacent first touch electrode strips 104 and two adjacent second touch electrode strips 106 in the border region 102b. Thus, through the different maximum included angles $\theta_L$ formed by the same first touch electrode strip 104 and different second touch electrode strips 106, the fingerprint sensor 100A may provide different sensing characteristics in the central region 102a and the border region 102b. For example, because the first area A1 in the central region 102a is not equal to the second area A2 in the border region 102b, different sensing resolutions may be provided in the central region 102a and the border region 102b. Alternatively, for example, different coupling capacitance differences may be provided in the central region 102a and the border region 102b. For another example, the two maximum included angles $\theta_L$ may be both located in the central region 102a or both located in the border region 102b.

In this embodiment, the first touch electrode strips 104 and the second touch electrode strips 106 intersect in a non-perpendicular manner, and are mutually insulated. Further, a sensing unit is formed at each of the intersections to sense the corresponding fingerprint image. For example, the first touch electrode strips 104 and the second touch electrode strips 106 may be driving electrodes and sensing electrodes, respectively, and, for example, the first touch electrode strips 104 may be disposed between the second touch electrode strips 106 and a finger, or vice versa. The first touch electrode strips 104 and the second touch electrode strips 106 may be disposed on the same side of a substrate 110, with an insulating layer (not shown) formed between the two to electrically insulate the two from each other. Alternatively, the first touch electrode strips 104 and the second touch electrode strips 106 may be respectively formed on two opposite sides of the same substrate, or respectively formed on different substrates and bonded by an adhesive layer, for example.

Figure 2:
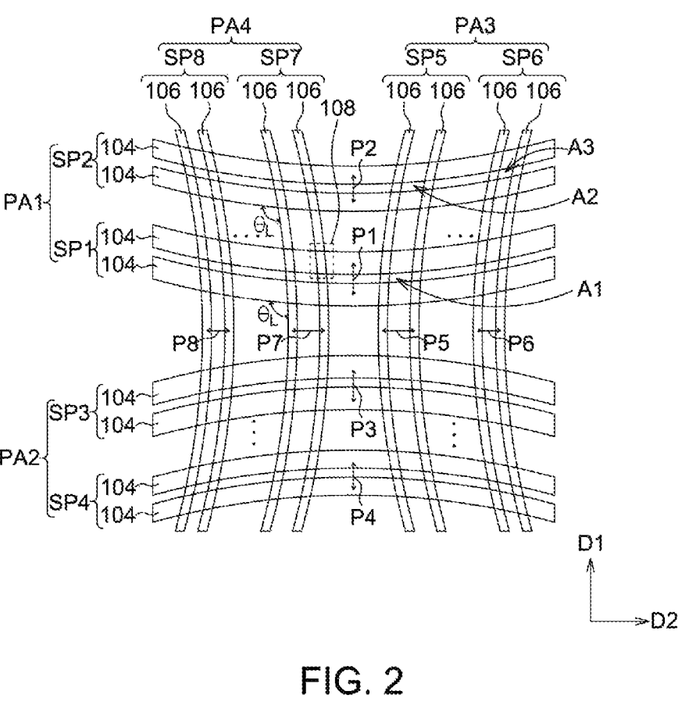
FIG. 2 is a top view of first touch electrode strips and second touch electrode strips according to the first embodiment of the present invention.

FIG. 2 shows a top view of the first touch electrode strips and the second touch electrode strips according to the first embodiment of the present invention. Referring to FIG. 1 and FIG. 2, a plurality of first touch electrode strips 104 may be arranged in parallel and appear symmetrical to a straight line along a first direction D1, such that centers of the first touch electrode strips 104 locate along the first direction D1. The maximum included angle $\theta_L$ corresponding to the same first touch electrode strip 104 gradually increases from the center towards two ends of the first touch electrode strip 104. More specifically, each of the first touch electrode strips 104 may be arc-shaped. For example, offsets of the center and one end of each of the arc-shaped first touch electrode strips 104 may be 10 μm. As shown, the plurality of first touch electrode strips 104 may be at least grouped into a first part PA1 and a second part PA2. First sides of the first touch electrode strips 104 in the first part PA1 bend towards the first direction D1, and second sides of the first touch electrode strips 104 in the first part PA1 opposite the first side face towards an opposite direction of the first direction D1, in a way that the first sides and the second sides of the first touch electrode strips 104 in the first part PA1 are concave sides and convex sides, respectively. Thus, the maximum included angle $\theta_L$ corresponding to the first part PA1 is located between the second side of the first touch electrode strip 104 in the first part PA1 and the second touch electrode strip 106. Conversely, the second sides of the first touch electrode strips 104 in the second part PA2 opposite the first sides bend towards an opposite direction of the first direction D1, with the first sides facing the first direction D1, such that the first sides and the second sides of the first touch electrode strips 104 in the second part PA2 are convex sides and concave sides, respectively. The second part PA2 and the first part PA1 may be sequentially disposed along the first direction D1, such that the convex second sides of the first touch electrode strips 104 in the first part PA1 face the convex first sides of the first touch electrode strips 104 in the second part PA2. Thus, the maximum included angle $\theta_L$ of the second part PA2 is located between the first side of the first touch electrode strip 104 and the second touch electrode strip 106 in the second part PA2. Preferably, the first part PA1 and the second part PA2 may be symmetrical to the center of the fingerprint recognition area 102. In another embodiment, the first sides of the first touch electrode strips 104 in the first part PA1 and the first sides of the first touch electrode strips 104 in the second part PA2 are both convex sides or both concave sides. It should be noted that, although the first touch electrode strips 104 in the first part PA1 and the first touch electrode strips 104 in the second part PA2 bend towards different directions, the maximum included angles $\theta_L$ of the first touch electrode strips 104 and the second touch electrode strips 106 in the second part PA1 and the second part PA2 may gradually increase from the centers of the first touch electrode strips 104 towards the two ends, such that the maximum included angles $\theta_L$ in the central region 102a are smaller than the maximum included angles $\theta_L$ in the border region 102b.

A pitch between the centers of two adjacent first touch electrode strips 104 near the center of the fingerprint recognition area 102 may be different from a pitch between the centers of two adjacent first touch electrode strips 104 away from the center of the fingerprint recognition area 102; that is, the pitches between the first touch electrode strips 104 near and away from the center of the fingerprint recognition area are different. In this embodiment, the pitch between the centers of two adjacent first touch electrode strips 104 in the first part PA1 near the second part PA2 is greater than the pitch between the centers of two adjacent first touch electrode strips 104 in the first part PA1 away from the second part PA2, and the pitch between the centers of two adjacent first touch electrode strips 104 in the second part PA2 near the first part PA1 is greater than the pitch between the centers of two adjacent first touch electrode strips 104 in the second part PA2 away from the first part PA1. More specifically, the first touch electrode strips 104 in the first part PA1 may include a first sub-part SP1 and a second sub-part SP2. The first sub-part SP1 is located between the second sub-part SP2 and the second part PA2. For example, the first sub-part SP1 may cross the central region 102a, and the second sub-part SP2 is located in the border region 102*b*, but the present invention is not limited herein. A first pitch P1 is present between the centers of two adjacent first touch electrode strips 104 in the first sub-part SP1, a second pitch P2 is present between the centers of two adjacent first touch electrode strips 104 in the second sub-part SP2, and the first pitch P1 is greater than the second pitch P2. Thus, compared to the second sub-part SP1 having a smaller pitch, the first sub-part SP1 having a larger pitch is closer to the first part PA2, preferably, closer to the center of the fingerprint recognition area 102. For example, in this embodiment, the pitch between two adjacent first touch electrode strips 104 in the first sub-part SP1 is equal to the pitch between two adjacent first touch electrode strips 104 in the second sub-part SP2, with however the width of the first touch electrode strips 104 in the first sub-part SP1 being larger than the width of the first touch electrode strips 104 in the second sub-part SP2. Thus, the first pitch P1 may be greater than the second pitch P2. For example, the width of the first touch electrode strips 104 in the first sub-part SP1 may be 50 μm, the width of the first touch electrode strips 104 in the second sub-part may be 30 μm, and the pitch between two adjacent first touch electrode strips 104 may be 20 μm. Thus, for example, the first pitch P1 may be 70 μm, and the second pitch P2 may be 50 μm. The present invention is not limited to the above design. In another embodiment, regarding the design of the first pitch P1 and the second pitch P2, the width of the first touch electrode strips 104 in the first sub-part SP1 is equal to the width of the first touch electrode strips 104 in the second sub-part SP2, and the pitch between two adjacent first touch electrode strips 104 in the first sub-part SP1 is greater than the pitch between two adjacent first touch electrode strips 104 in the second sub-part SP2.

Similarly, the second part P2 may include a third sub-part SP3 and a fourth sub-part SP4. In this embodiment, the third sub-part SP3 is located between the fourth sub-part SP4 and the first part PA1. For example, the third sub-part SP3 may cross the central region 102*a*, and the fourth sub-part is located in the border region 102*b*. A third pitch P3 is present between two adjacent first touch electrode strips 104 in the third sub-part SP3, a fourth pitch P4 is present between two adjacent first electrode strips 104 in the fourth sub-part SP4, and the third pitch P3 is greater than the fourth pitch P4. Therefore, compared to the fourth sub-part SP4 having a smaller pitch, the third sub-part SP3 having a larger pitch is closer to the first pitch P1, preferably closer to the center of the fingerprint recognition area 102. Preferably, the first pitch P1 may be equal to the third pitch P3, and the second pitch P2 may be equal to the fourth pitch P4. Because design details of the third pitch P3 being larger than the fourth pitch P4 in the second part PA2 are identical to those in the first part PA1, and shall be omitted herein. In another embodiment, the first pitch P1, the second pitch P2, the third pitch P3 and the fourth pitch P4 may be different from one another based on design requirements.

Although being arranged in a different direction from the first touch electrode strips 104, the second touch electrode strips 106 in the embodiment may have the same structure as the first touch electrode strips 104. More specifically, the second touch electrode strips 106 may also be arc-shaped and arranged in a parallel. Thus, the maximum included angles $\theta_L$ of the second touch electrode strips 106 and the first touch electrode strips 104 may also gradually increase from the centers towards two ends of the second touch electrode strips 106, hence providing a more significant difference between the maximum included angle $\theta_L$ in the central region 102*a* and the maximum included angle $\theta_L$ in the border region 102*b*. The second touch electrode strips 106 may be symmetrical to the second direction D2, in a way that the centers of the second touch electrode strips 106 are arranged along the second direction D2. For example, offsets of the center and one end of each of the arc-shaped first touch electrode strips 104 in the second direction D2 may be 10 μm. One of a first touch electrode strip 104 and a second touch electrode strip 106 that intersect each other may be arc-shaped. In another variation of the embodiment, one of a first touch electrode strip 104 and a second touch electrode strip 106 that intersect each other is arc-shaped while the other are straight-strip-shaped.

The second touch electrode strips 106 may include a third part PA3 and a fourth part PA4. Third sides of the second touch electrode strips 106 in the third part PA3 bend towards the second direction D2, and fourth sides opposite the third sides face an opposite direction of the second direction D2, in a way that the third sides and the fourth sides of the second touch electrode strips 106 in the third part PA3 are concave sides and convex sides, respectively. Conversely, the third sides and the fourth sides of the second touch electrode strips 106 in the fourth part PA4 are convex sides and concave sides, respectively. The fourth part PA4 and the third part PA3 may be sequentially disposed along the second direction D2, and the convex fourth sides of the second touch electrode strips 106 in the third part PA3 face the convex third sides of the second touch electrode strips 106 in the fourth part PA4. Preferably, the third part PA3 and the fourth part PA4 may be symmetrical to the center of the fingerprint recognition area 102. In another embodiment, the third sides of the second touch electrode strips 106 in the third part PA3 and the third sides of the second touch electrode strips 106 in the fourth part PA4 may be both be convex sides or both be concave sides.

In this embodiment, the second touch electrode strips 106 in the third part PA3 and the fourth part PA4 may have different pitches. The pitch between the centers of two adjacent second touch electrode strips 106 in the third part PA3 near the fourth part PA4 is greater than the pitch between the centers of two adjacent second touch electrode strips 106 in the third part PA3 away from the fourth part PA4, and the pitch between the centers of two adjacent second touch electrode strips 106 in the fourth part PA4 near the third part PA3 is greater than the pitch between the centers of two adjacent second touch electrode strips 106 in the fourth part PA4 away from the third part PA3. More specifically, the second touch electrode strips 106 in the third part PA3 include a fifth sub-part SP5 and a sixth sub-part SP6, wherein the fifth sub-part SP5 is disposed between the sixth sub-part SP6 and the fourth part PA4. For example, the fifth sub-part SP5 may cross the central region 102*a*, and the sixth sub-part SP6 is located in the border region 102*b*. A fifth pitch P5 between the centers of two adjacent second touch electrode strips 106 in the fifth sub-part SP5 may be larger than a sixth pitch SP6 between the centers of two adjacent second touch electrode strips 106 in the sixth sub-part SP6. Thus, compared to the six sub-part SP6 having a smaller pitch, the fifth sub-part SP5 having a larger pitch is closer to the fourth part PA4, preferably closer to the center of the fingerprint recognition area 102. In this embodiment, the width of the second touch electrode strips 106 in the fifth sub-part SP5 is equal to the width of the second touch electrode strips 106 in the sixth sub-part SP6, with however the pitch between two adjacent second touch electrode strips 106 in the fifth sub-part SP5 being greater than the pitch between two adjacent second touch electrode strips 106 in the sixth sub-part SP6. For example, the pitch between two adjacent second touch electrode strips 106 in the fifth sub-part SP5 may be 50 μm, the pitch between two adjacent second touch electrode strips 106 in the sixth sub-part SP6 may be 30 μm, and the width of the second touch electrode strips 106 may be 20 μm. The present invention is not limited to the above design. In another embodiment, to design the fifth pitch P5 to be greater than the sixth pitch P6, the pitch between two adjacent second touch electrode strips 106 in the fifth sub-part SP5 may be equal to the pitch between two adjacent second touch electrode strips 106 in the sixth sub-part SP6, and the width of the second touch electrode strips 106 in the fifth sub-part SP5 is larger than the width of the second touch electrode strips 106 in the sixth sub-part SP6.

The second touch electrode strips 106 in the fourth part PA4 include a seventh sub-part SP7 and an eighth sub-part SP8. The seventh sub-part SP7 is disposed between the eighth part SP8 and the third part PA3. For example, the seventh sub-part SP7 may cross the central region 102a, and the eighth sub-part SP8 is located in the border region 102b. A seventh pitch P7 between the centers of two adjacent second touch electrode strips 106 in the seventh sub-part SP7 may be greater than an eighth pitch P8 between the centers of two adjacent second touch electrode strips 106 in the eighth sub-part SP8. Thus, compared to the eighth sub-part SP8 having a smaller pitch, the seventh sub-part SP7 having a larger pitch is closer to the third part PA3, preferably closer to the center of the fingerprint recognition area 102. Details for designing the seventh pitch P7 to be greater than the eighth pitch P8 in the fourth part PA4 are identical to those in the third part PA3, and shall be omitted herein. In this embodiment, the fifth pitch P5 and the seventh pitch P7 may be equal, and the sixth pitch P6 and the eighth pitch P8 may be equal. Further, for example, the fifth pitch P5 may be equal to the first pitch P1, and the sixth pitch P6 may be equal to the second pitch P2. In another embodiment, the fifth pitch P5 may be different from the first pitch P1, and/or the sixth pitch P6 may be different from the second pitch P2. Alternatively, the fifth pitch P5, the sixth pitch P6, the seventh pitch P7 and the eighth pitch P8 may be designed to be different based on design requirements.

Effects of the fingerprint sensor of the embodiment are given below. In this embodiment, since the intersection of the first part PA1 and the third part PA3 and the intersection of the first part PA1 and the fourth part PA4, as well as the intersection of the second part PA2 and the third part PA3 and the intersection of the second part PA2 and the fourth part PA4, are symmetrical, only the intersection of the first part PA1 and the third part PA3 is descripted below as an example. In the fingerprint sensor 100A of the embodiment, the first touch electrode strips 104 and the second touch electrode strips 106 are designed to be arc-shaped, and the first pitch P1 of the first sub-part SP1 in the central region 102a is greater than the second pitch P2 of the second sub-part SP2 in the border region 102b. Thus, the first area A1 surrounded by two adjacent first touch electrode strips in the first sub-part SP1 and two adjacent second touch electrode strips 106 in the fifth sub-part SP5 in the central region 102a is larger than the second area A2 surrounded by two first touch electrode strips 104 in the second sub-part SP2 and two adjacent second touch electrode strips 106 in the fifth sub-part SP5 in the border region 102b. As such, when a finger presses on the fingerprint sensor 100A, coupling capacitance between the finger and the first area A1 in the central region 102a is larger, in a way that the coupling capacitance differences between ridges and valleys of the fingerprint sensed by sensing units 108 in the central region 102a are greater than coupling capacitance differences between the ridges and valleys of the fingerprint sensed by sensing units 108 corresponding to the fifth sub-part SP5 in the border region 102b, hence enhancing the sensitivity of the fingerprint sensor 100A in the central region 102a. Further, the second pitch P2 in the second sub-part SP2 in the border region 102b is smaller, and so the number of sensing units 108 per unit area in the border region 102b is larger than the number of sensing unit 108 per unit area in the central region 102a; that is, the density of the sensing units 108 in the border region 102b is higher such that the fingerprint sensor 100A has a higher resolution in the border region 102b. Despite that the coupling capacitance differences corresponding to the second sub-part SP2 are smaller due to the smaller second pitch P2, because the second touch electrode strips 106 are also arc-shaped, the maximum included angles $\theta_L$ of the first touch electrode strips 104 in the second sub-part SP2 and the second touch electrode strips 106 in the fifth sub-part SP5 are greater than the maximum included angles $\theta_L$ of the first touch electrode strips 104 in the first sub-part SP1 and the second touch electrode strips 106 in the fifth sub-part SP5. As a result, the second area A2 is effectively increased and the coupling capacitance differences corresponding to the second sub-part are also compensated to evenly distribute the coupling capacitance differences between the central region 102a and the border region 102b. Further, the sixth pitch P6 in the sixth sub-part SP6 is smaller than the fifth pitch P5 in the fifth sub-part SP5, such that a third area A3 surrounded by two adjacent first touch electrode strips 104 in the second sub-part SP2 and two adjacent second touch electrode strips 106 in the sixth sub-part SP6 at the corner of the border region 102b is smaller. However, as the intersection of the second sub-part SP2 and the sixth sub-part SP6 is near ends of the first touch electrode strips 104 and the second touch electrode strips 106, the maximum included angles $\theta_L$ of the first touch electrode strips 104 in the second sub-part SP2 and the second touch electrode strips 106 in the sixth sub-part SP6 are greater than the maximum included angles $\theta_L$ of the first touch electrode strips 104 in the second sub-part SP2 and the second touch electrode strips 106 in the fifth sub-part SP5. Thus, not only the coupling capacitance differences in the second sub-part SP2 and the sixth sub-part SP6 may be compensated, but also the coupling capacitance differences in the border region 102b may be evenly distributed. Therefore, while increasing the resolution of the border region 102 of the fingerprint sensor 100A, the fingerprint sensor 100A of the embodiment is further capable of evenly distributing the coupling capacitance differences of the entire fingerprint sensor 100A through adjusting the maximum included angles $\theta_L$ in the border region 102b.

Figure 3:
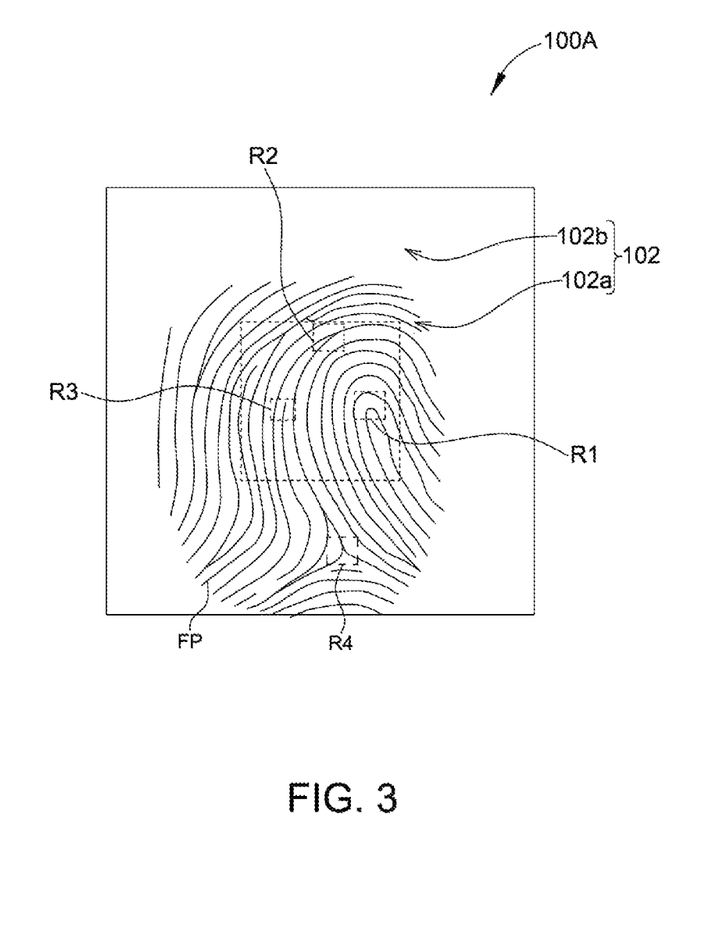
FIG. 3 is a relationship diagram of a fingerprint and a fingerprint sensor.

FIG. 3 shows a schematic diagram of the relationship between a fingerprint and a fingerprint sensor. As shown in FIG. 3, the fingerprint PF may include a plurality of characteristic regions R1, R2, R3 and R4. For example, the characteristic region R1 is a center of the fingerprint FP, the characteristic region R2 is a bifurcation point of a line of the fingerprint FP, the characteristic region R3 is an end of a line of the fingerprint FP, and the characteristic region R4 is a triangular point of the fingerprint FP. In this embodiment, the characteristic regions R1, R2 and R3 may be located in the central region 102a, and the characteristic region R4 may be located in the border region 102b. It should be noted that, images of the characteristic regions R1, R2, R3 and R4 in predetermined regions of the fingerprint and the entire fingerprint are identified when the fingerprint FP is identified. Thus, while maintaining a predetermined resolution, the fingerprint sensor 100A of the embodiment is capable of enhancing the coupling capacitance differences, such that even coupling capacitance differences are provided when the fingerprint sensor 100a detects the characteristic regions R1, R2, R3 and R4 in the central region 102a and the border region 102b, hence enhancing the accuracy of the image of the fingerprint FP. Meanwhile, more image information of the fingerprint FP located in the border region 102b is obtained by increasing the resolution of the border region 102b, which further helps promoting the recognition of the fingerprint FP.

The fingerprint sensor of the embodiment is not limited to the above examples. Other variations of the fingerprint of the embodiment are sequentially described below. To compare differences of the variations and to keep the illustration simple, the same components in these variations are denoted by the same symbols, the differences of the variations are given, and repeated details are omitted.

Figure 4:
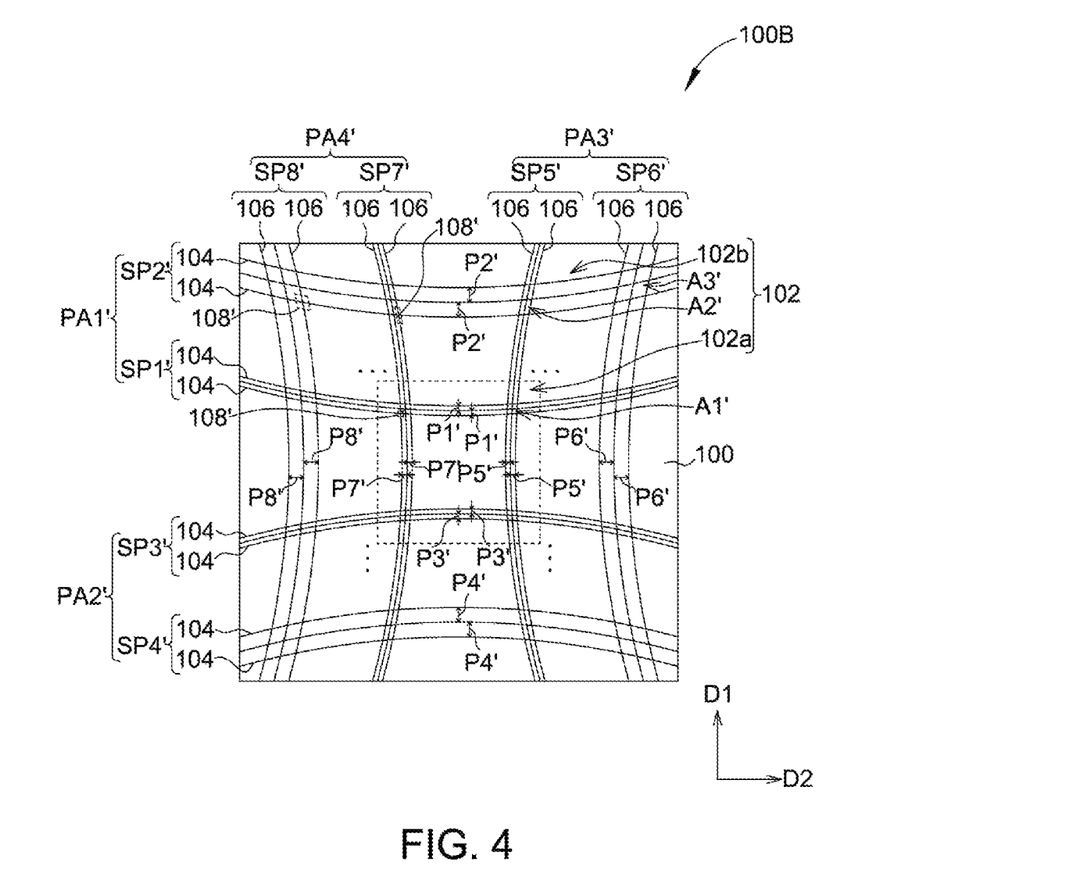
FIG. 4 is a top view of a fingerprint sensor according to a first variation of the first embodiment of the present invention.

FIG. 4 shows a top view of a fingerprint sensor according to a first variation of the first embodiment of the present invention. As shown in FIG. 4, compared to the above embodiment, in a fingerprint sensor 100B of this variation embodiment, a pitch between the centers of two adjacent first touch electrode strips 104 in a first part PA' near a second part PA2' is smaller than a pitch between the centers of two adjacent first touch electrode strips 104 in the first part PA1' away from the second part PA2', and a pitch between the centers of two adjacent first touch electrode strips 104 in the second part PA2' near the first part PA1' is smaller than a pitch between the centers of two adjacent first touch electrode strips 104 in the second part PA2' away from the first part PA1'. More specifically, a first pitch P1' in a first sub-part SP1' near the second part PA2' is smaller than a second pitch P2' in a first sub-part P1' away from a second sub-part SP2', and a third pitch P3' in a third sub-part SP3' near the first part PA1' is smaller than a fourth pitch P4' in a fourth sub-part SP4' away from the first part PA1'. Similarly, in this variation, a pitch between the centers of two adjacent second touch electrode strips 106 in a third part PA3' near a fourth part PA4' is smaller than a pitch between the centers of two adjacent second touch electrode strips 106 in the third part PA3' away from the fourth part PA4', and a pitch between the centers of two adjacent second touch electrode strips 106 in the fourth part PA4' near the third part PA3' is smaller than a pitch between the centers of two adjacent second touch electrode strips 106 in the fourth part PA4' away from the third part PA3'. That is to say, a fifth pitch P5' in a fifth sub-part SP5' is smaller than a sixth pitch P5' in a sixth sub-part SP5', and a seventh pitch P7' in a seventh sub-part SP7 is smaller than an eighth pitch P8' in an eighth sub-part SP8'.

In the fingerprint sensor 100B of this variation embodiment, the first pitch P1', the third pitch P3', the fifth pitch P5' and the seventh pitch P7' in the central region 102a are respectively smaller than the second pitch P2', the fourth pitch P4', the sixth pitch P6' and the eighth pitch P8' in the central region 102a. Thus, a first area A1' surrounded by two adjacent first touch electrode strips 104 and two adjacent second touch electrode strips 104 in the central region 102a is smaller than a second area A2' surrounded by two adjacent first touch electrode strips 104 and two adjacent second touch electrode strips 106 in the border region 102b. Accordingly, the number of sensing units 108' per unit area in the border region 102b is smaller than the number of sensing units 108' per unit area in the central region 102a. That is to say, the density of the first touch electrode strips 104 allotted in the central region 102a may be increased to increase the resolution of the fingerprint sensor 100B in the central region 102a. Therefore, the fingerprint sensor 100B according to the variation of the embodiment is capable of increasing the resolution of an image captured corresponding to the fingerprint of the central region 102a, so as to obtain more characteristic regions in the fingerprint located in the central region 102a to enhance the rate of fingerprint recognition.

Figure 5:
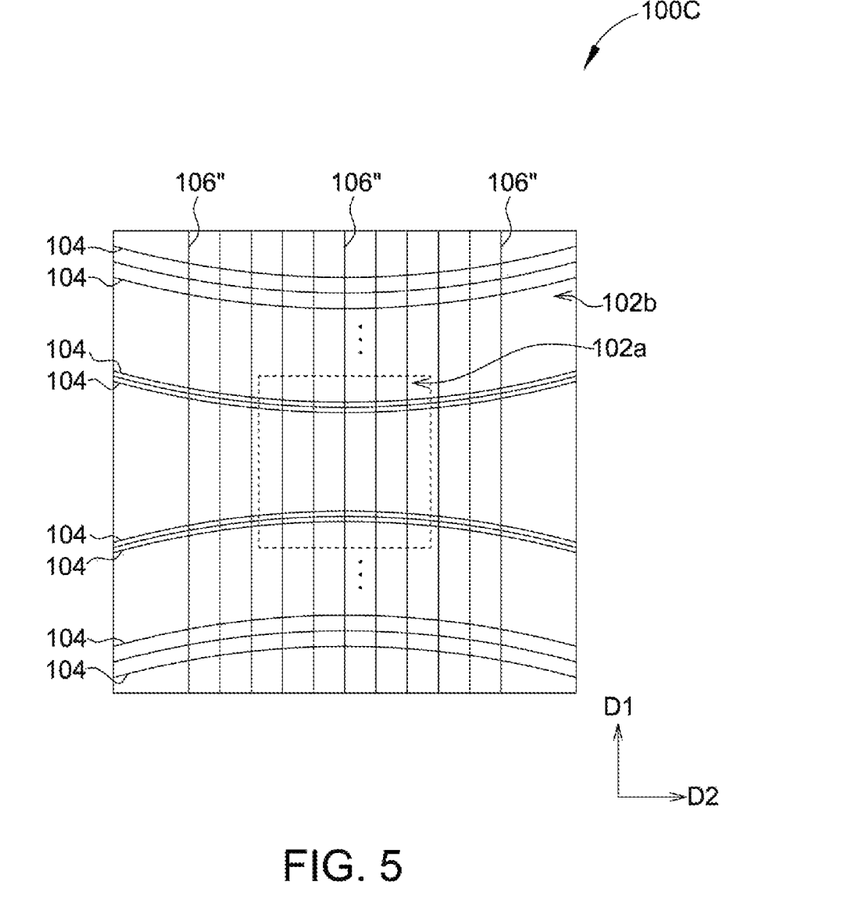
FIG. 5 is a top view of a fingerprint sensor according to a second variation of the first embodiment of the present invention.

FIG. 5 shows a top view of a fingerprint sensor according to a second variation of the first embodiment of the present invention. As shown in FIG. 5, compared to the first variation, in a fingerprint sensor 100C according to this variation embodiment, second touch electrode strips 106" are straight-strip-shaped. In another embodiment, the pitch between the centers of two adjacent first touch electrode strips 104 in the central region 102a may be greater than the pitch between the centers of two adjacent first touch electrode strips 104 in the border region 102b.

Figure 6:
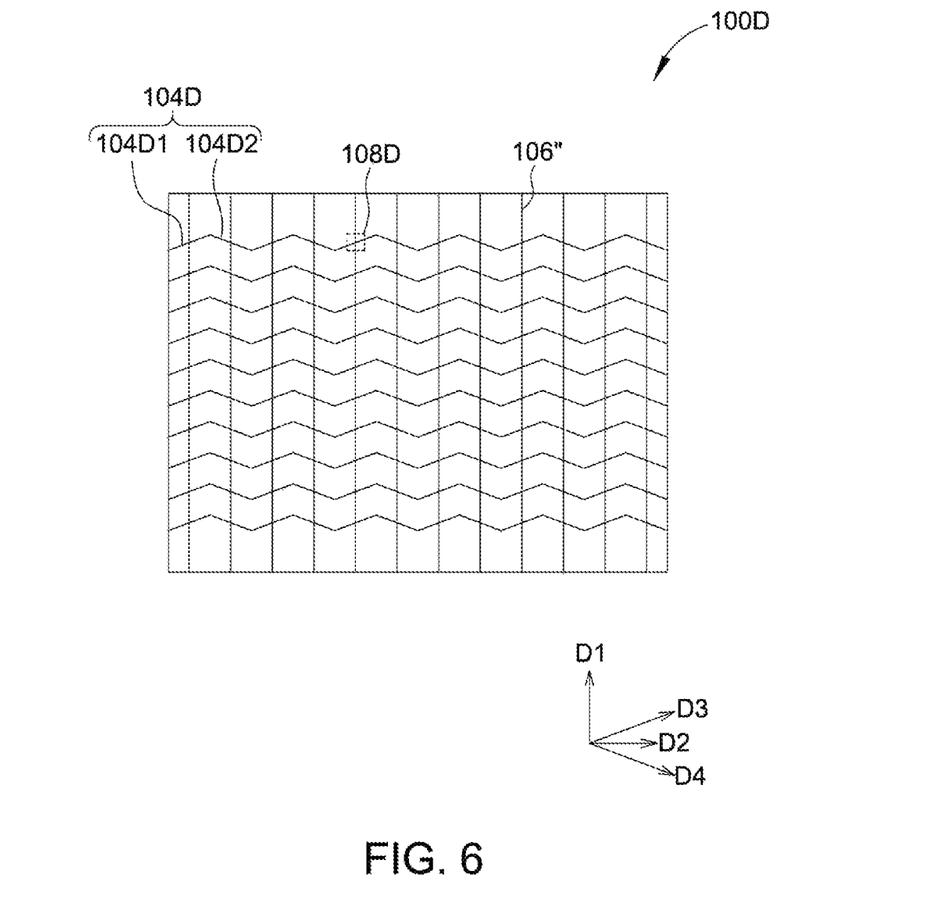
FIG. 6 is a top view of a fingerprint sensor according to a third variation of the first embodiment of the present invention.

The first touch electrode strips and the second touch electrode strips of the present invention are not limited to being arc-shaped, and may also be other shapes to achieve the object of intersecting in a non-perpendicular manner. FIG. 6 shows a top view of a fingerprint sensor according to a third variation of the first embodiment of the present invention. As shown in FIG. 6, compared to the second variation embodiment, first touch electrode strips 104D of a fingerprint sensor 100D according to this variation embodiment are wave-shaped. More specifically, the each of the first touch electrode strips 104D includes a plurality of first strip portions 104D1 and a plurality of second strip portions 104D2. The first strip portions 104D1 and the second strip portions 104D2 are alternately arranged in a serial connection to form a wavy first touch electrode strips 104D. The first strip portions 104D1 extend along a third direction that is neither parallel nor perpendicular to the first direction D1 and the second direction D2, and the second strip portions 104D extend along a fourth direction D4 that is neither parallel nor perpendicular to the first direction D1 and the second direction D2. In this variation embodiment, the third direction D3 is different from the fourth direction D4. For example, the included angle between the third direction D3 and the first direction D1 is smaller than 90 degrees, and the included angle between the fourth direction D4 and the first direction D1 is greater than 90 degrees. Further, each of the second touch electrode strips 106" intersects the corresponding first strip portion 104D1 or the corresponding second strip portion 104D2, such that the first touch electrode strips 104D and the second touch electrode strips 106" intersect in a non-perpendicular manner. Because a minimum included angle at each of the intersections of the first touch electrode strips 104D and the second touch electrode strips 106" is smaller than 90 degrees, the coupling capacitance between the first touch electrode strips 104D and the second touch electrode strips 106" is larger in a way that each sensing unit 108D may have a greater sensing amount to further enhance the rate of fingerprint recognition of the fingerprint sensor 100D. In another variation embodiment, the second touch electrode strips 106" may intersect the first touch electrode strips 104D at intersections of the first strip portions 104D1 and the second strip portions 104D2.

Figure 7:
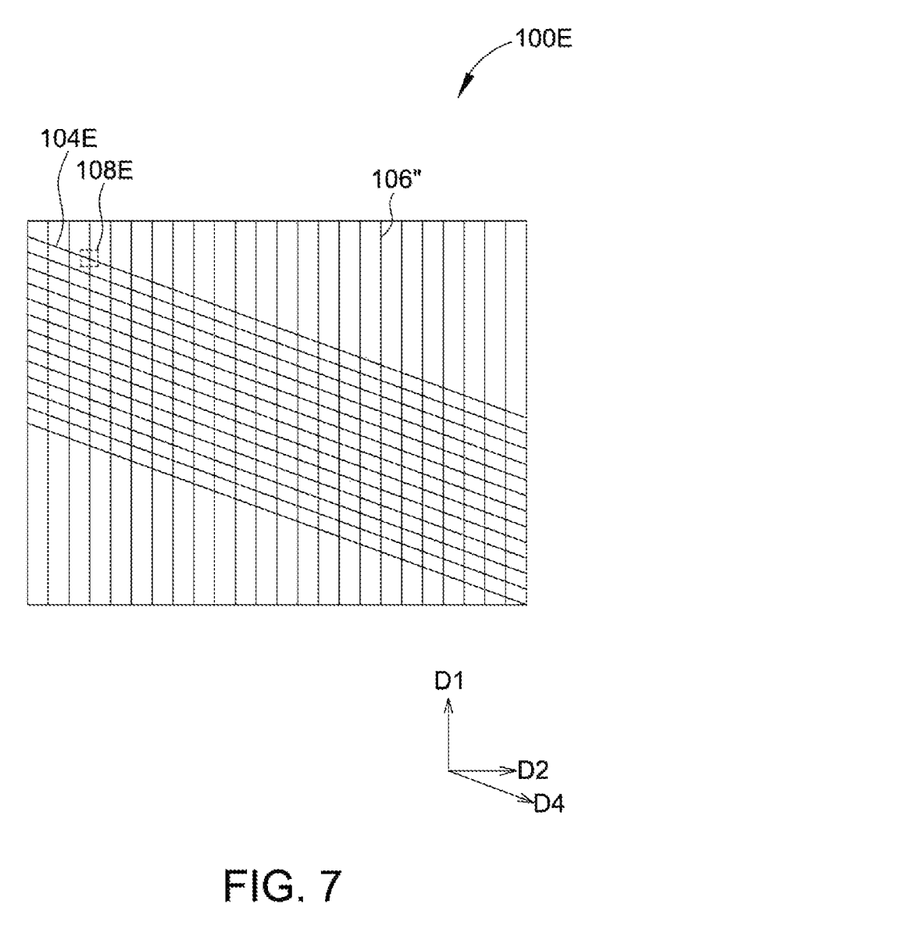
FIG. 7 is a top view of a fingerprint sensor according to a fourth variation of the first embodiment of the present invention.

FIG. 7 shows a top view of a fingerprint sensor according to a fourth variation of the first embodiment of the present invention. As shown in FIG. 7, compared to the third variation embodiment, first touch electrode strips 104E and second touch electrode strips 106" of a fingerprint sensor 100E according to this variation embodiment are straight-strip-shaped. Further, the first touch electrode strips 104E extend along a fourth direction, and intersect the second touch electrode strips 106" in a non-perpendicular manner; that is, a minimum included angle at each of the intersections of the first touch electrode trips 104E and the second touch electrode strips 106" is smaller than 90 degrees. Thus, each sensing units 108E may have a larger sensing amount.

Figure 8:
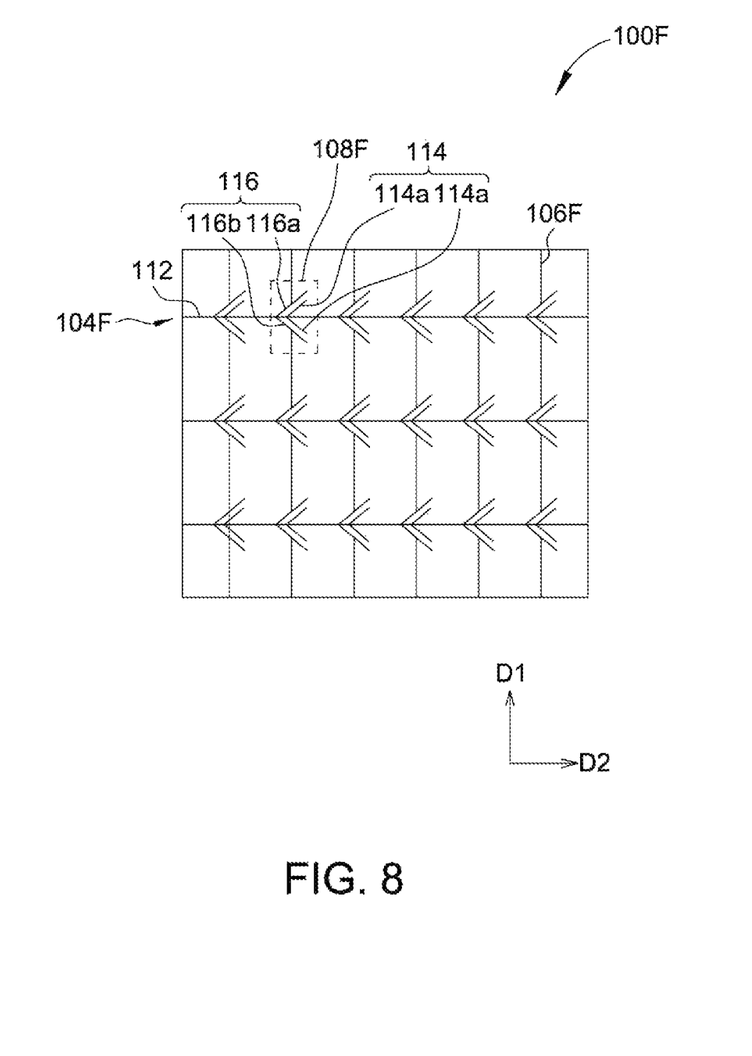
FIG. 8 is a top view of a fingerprint sensor according to a fifth variation of the first embodiment of the present invention.

FIG. 8 shows a top view of a fingerprint sensor according to a fifth variation of the first embodiment of the present invention. As shown in FIG. 8, in a fingerprint sensor 100F of this variation embodiment, each of the first touch electrode strips 104F includes a main stem 112 and a plurality of branch groups 114. Each of the second touch electrode strips 106F includes a plurality of bent structures 116 and a plurality of connecting lines 118. In the same first touch electrode strip 104F, each of the branch groups 114 includes two branches 114a, which respectively extend from two sides of the main stem 112 and are not parallel to each other. In the same second touch electrode strip 106F, each of the bent structures 112 is connected between two adjacent connecting lines 118, such that the bent structures 116 and the connecting lines 118 are connected in series to form one first touch electrode strip 106F. More specifically, each bent structure 116 includes a third strip portion 116a and a fourth strip portion 116b. One end of the third strip portion 116a is connected to one end of the fourth strip portion 116b, and a minimum included angle between the third strip portion 116a and the fourth strip portion 116b is smaller than 180 degrees. Further, two adjacent lines 118 are respectively connected to an outer side of the third strip portion 116a and the fourth strip portion 116b of the bent structure 116. Further, the main stem 112 of each of the first touch electrode strips 104F crosses the second touch electrode strip 106F at an intersection of the fourth strip portion 116a and the fourth strip portion 116b to form a sensing unit 108F. It should be noted that, in each of the sensing units 108F, each branch group 114 is disposed between the third strip portion 116a and the fourth strip portion 116b of the corresponding bent structure 116, and the branch 114a of each branch group 114 is parallel to the third strip portion 116a and the fourth strip portion 116b, such that the branch 114a is able to generate coupling capacitance with the third strip portion 116a and the fourth strip portion 116b to determine the value of sensed capacitance of the sensing unit 108F. Through the design of the branch groups 114 and the bent structures 116 of this variation embodiment, the sensing capacitance of the sensing units 108F may be increased through increasing the length of the branches 114a as well as the lengths of the third strip portions 116a and the fourth strip portions 116b, hence enhancing the rate of fingerprint recognition of the fingerprint sensor 100F. In this variation embodiment, the third strip portions 116a and the fourth strip portions 116b of different bent structures 116 may have equal lengths, and the branches 114a of different branch groups 114 may have equal lengths. In another embodiment, the third strip portions 116a and the fourth strip portions 116b of different bent structures 116 may have different lengths according to corresponding positions, and the branches 114a of different branch groups 114 may also have different lengths according to corresponding positions. For example, the third strip portions 116a and the fourth strip portions 116b as well as branches 114a corresponding to a characteristic region of the fingerprint may have longer lengths, so that the corresponding sensing units 108F may have larger values of sensed capacitance, while the third strip portions 116a, the fourth strip portions 116b and the branches 114a corresponding to other regions may have shorter lengths.

Figure 9:
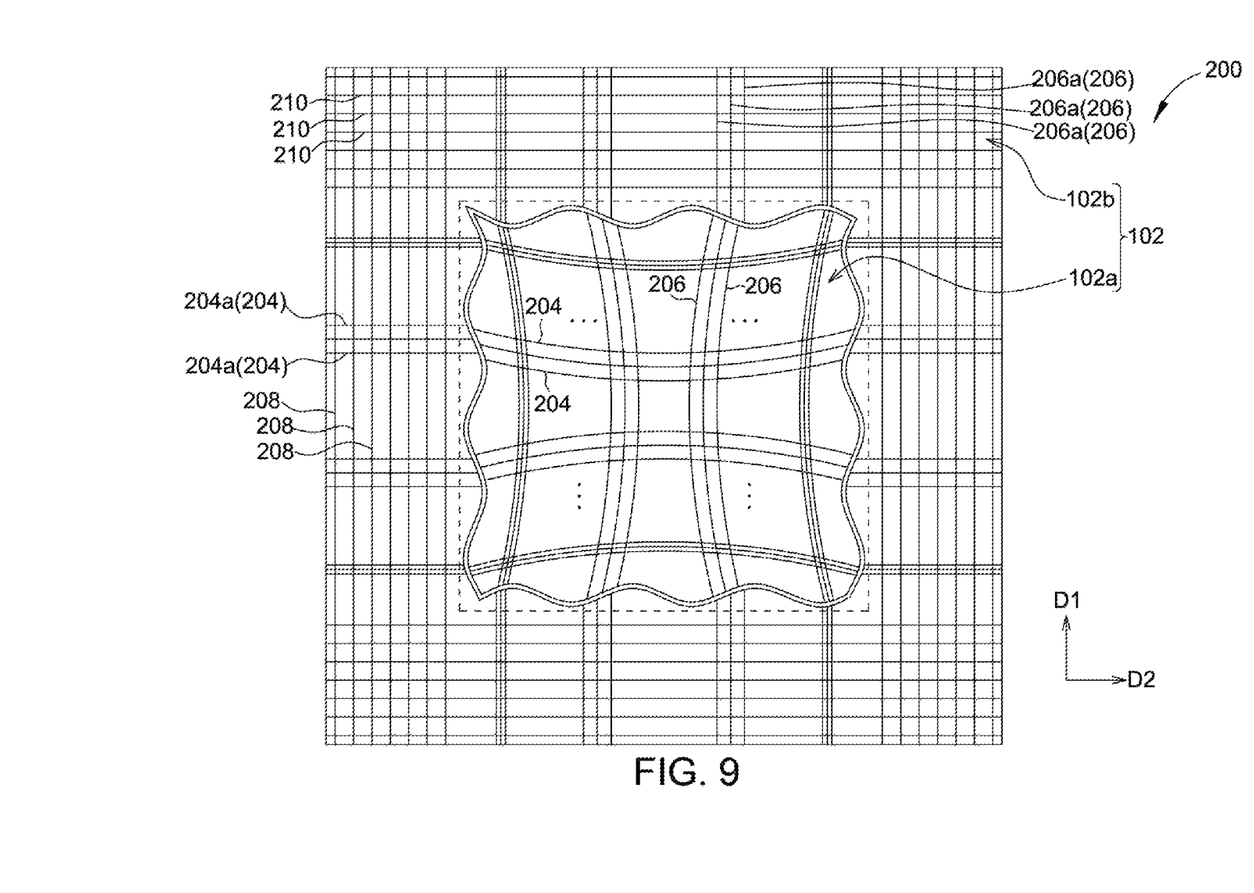
FIG. 9 is a top view of a fingerprint sensor according to a second embodiment of the present invention.

FIG. 9 shows a top view of a fingerprint sensor according to a second embodiment of the present invention. As shown in FIG. 9, compared to the first embodiment, in a fingerprint sensor 200 according to the second embodiment, first touch electrode strips 204 and the second touch electrode strips 206 that are located in the central region 102a are arc-shaped and intersect in a non-perpendicular manner; the first touch electrode strips 204 and the second touch electrode strips 206 that are located in the border region 102b may intersect perpendicularly or intersect in a different non-perpendicular manner. In other words, the part of the first touch electrode strips 204 located in the border region 102 are differently-shaped from the part located in the central region 102a. In this embodiment, the first touch electrode strips 204 and the second touch electrode strips 206 in the central region 102a may be identical to those in the first embodiment, and associated details shall be omitted herein. In this embodiment, the first touch electrode strips 204 and the second touch electrode strips 206 may include straight-strip portions 204a and 206a and are located in the border region 102b. The fingerprint sensor 200 may further include straight-strip-shaped third touch electrode strips 208 and straight-strip-shaped touch electrode strips 210 disposed in the border region 102b. The third touch electrode strips 208 are arranged along the first direction D1, and the fourth touch electrode strips 210 are arranged along the second direction D2. The third touch electrode strips 208 intersect the straight-strip portions 206a of the second touch electrode strips 206, and the fourth touch electrode strips 210 intersect the straight-strip portions 204a of the first touch electrode strips 204. It should be noted that, in this embodiment, through differentiating the sensing resolutions and coupling capacitance differences between the central region 102a and the border region 102b, sensing is performed on a fingerprint in a predetermined region to obtain a more accurate fingerprint image and more characteristic regions of the fingerprint. In another embodiment, the first touch electrode strips 204 and the second touch electrode strips 206 in the central region 102a may be applied to any of the variations of the first embodiment. In another variation embodiment, parts of the first touch electrode strips 204 and the second touch electrode strips 206 that are located in the central region 102a may be straight-strip-shaped, and parts that are located in the border region 102b may be arc-shaped and do not intersect perpendicularly. In such situation, the third touch electrode strips 208 and the fourth touch electrode strips 210 located in the border region 102b are arc-shaped.

In conclusion, in the fingerprint sensor of the present invention, by designing the first touch electrode strips and the second touch electrode strips as bent structures and applying different pitches, the fingerprint sensor is allowed to obtain denser fingerprint image information for a fingerprint at different regions or to enhance the accuracy of fingerprint detection.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fingerprint sensor, having a central region and a border region, comprising:
   a plurality of first touch electrode strips, arranged along a first direction; and a plurality of second touch electrode strips, arranged along a second direction different from the first direction, wherein each of the first touch electrode strips intersects each of the second touch electrode strips to form a plurality of intersections, the first touch electrode strips and the second touch electrode strips form a plurality of maximum included angles, wherein a maximum included angle of the plurality of maximum included angles is formed at each intersection of the plurality of intersections, and a maximum included angle of a first touch electrode strip of the plurality of first touch electrode strips gradually increases from a center towards two ends of the first touch electrode strip.

2. The fingerprint sensor according to claim 1, wherein the first touch electrode strips and the second touch electrode strips intersect in a non-perpendicular manner.

3. The fingerprint sensor according to claim 1, wherein the first touch electrode strips in a first part bend towards the first direction, the first touch electrode strips in a second part bend towards an opposite direction of the first direction, and the first touch electrode strips in the second part and the first touch electrode strips in the first part are sequentially disposed along the first direction.

4. The fingerprint sensor according to claim 3, wherein a pitch between centers of two adjacent first touch electrode strips in the first part near the second part is greater than a pitch between centers of two adjacent first touch electrode strips in the first part away from the second part.

5. The fingerprint sensor according to claim 3, wherein a pitch between centers of two adjacent first touch electrode strips in the first part near the second part is smaller than a pitch between centers of two adjacent first touch electrode strips in the first part away from the second part.

6. The fingerprint sensor according to claim 3, wherein the second touch electrode strips in a third part bend towards the second direction, the second touch electrode strips in a fourth part bend towards an opposite direction of the second direction, and the second touch electrode strips in the fourth part and the second touch electrode strips in the third part are sequentially disposed along the second direction.

7. The fingerprint sensor according to claim 6, wherein a pitch between centers of two adjacent second touch electrode strips in the third part near the fourth part is greater than a pitch between centers of two adjacent second touch electrode strips in the third part away from the fourth part.

8. The fingerprint sensor according to claim 6, wherein a pitch between centers of two adjacent second touch electrode strips in the third part near the fourth part is smaller than a pitch between centers of two adjacent second touch electrode strips in the third part away from the fourth part.

9. The fingerprint sensor according to claim 3, wherein the second touch electrode strips are straight-strip-shaped.

10. The fingerprint sensor according to claim 1, wherein an offset of a center and one end of each of the first touch electrode strips in the first direction is about 10 micrometers.

11. A fingerprint sensor, having a central region and a border region, comprising:

a plurality of first touch electrode strips, arranged along a first direction; and a plurality of second touch electrode strips, arranged along a second direction different from the first direction, each of the first touch electrode strips intersecting each of the second touch electrode strips to form a plurality of intersections; wherein the first touch electrode strips and the second touch electrode strips form a plurality of maximum included angles, wherein a maximum included angle of the plurality of maximum included angles is formed at each intersection of the plurality of intersections, a maximum included angle of a first touch electrode strip of the plurality of first touch electrode strips gradually increases from a center towards two ends of the first touch electrode strip, a first area surrounded by two adjacent first touch electrode strips and two second touch electrode strips in the central region is not equal to a second area surrounded by two adjacent first touch electrode strips and two adjacent second touch electrode strips in the border region, the first touch electrode strips in a first part bend towards the first direction, the first touch electrode strips in a second part bend towards an opposite direction to the first direction, the first touch electrode strips in the second part and the first touch electrode strips in the first part are sequentially disposed along the first direction, and the first touch electrode strips in the first part are separate from the first touch electrode strips in the second part.

12. The fingerprint sensor according to claim 11, wherein the first touch electrode strips and the second touch electrode strips intersect in a non-perpendicular manner.

13. The fingerprint sensor according to claim 11, wherein the first area is greater than the second area.

14. The fingerprint sensor according to claim 13, wherein a sensing unit is formed at each of the plurality of intersections of the first touch electrode strips and the second touch electrode strips, and the number of the sensing units per unit area in the border region is greater than the number of the sensing units per unit area in the central region.

15. The fingerprint sensor according to claim 11, wherein the first area is smaller than the second area.

16. The fingerprint sensor according to claim 15, wherein a sensing unit is formed at each of the plurality of intersections of the first touch electrode strips and the second touch electrode strips, and the number of the sensing units per unit area in the border region is smaller than the number of the sensing units per unit area in the central region.

17. The fingerprint sensor according to claim 11, wherein at least one of one of the first touch electrode strips and one of the second touch electrode strips that intersect each other is arc-shaped.

18. The fingerprint sensor according to claim 17, wherein one of one of the first touch electrode strips and one of the second touch electrode strips that intersect each other is straight-strip-shaped.

19. The fingerprint sensor according to claim 11, wherein a part of one of the first touch electrode strips located in the border region is differently-shaped from another part in the central region, and one of the parts is arc-shaped.

20. A fingerprint sensor, having a central region, a border region, a top border, a bottom border, a left border and a right border, the fingerprint sensor comprising:

a plurality of first touch electrode strips, arranged along a first direction and each of the first touch electrode strips connecting to both the left border and the right border; and a plurality of second touch electrode strips, arranged along a second direction different from the first direction and each of the second touch electrode strips connecting to both the top border and the bottom border, wherein each of the first touch electrode strips intersects each of the second touch electrode strips in a non-perpendicular manner to form a plurality of intersections, the first touch electrode strips and the second touch electrode strips form a plurality of maximum included angles, wherein a maximum included angle of the plurality of maximum included angles is formed at each intersection of the plurality of intersections, and a maximum included angle of a first touch electrode strip of the plurality of first touch electrode strips gradually increases from a center towards two ends of the first touch electrode strip.

21. The fingerprint sensor according to claim 20, wherein at least one of one of the first touch electrode strips and one of the second touch electrode strips that intersect each other is arc-shaped.

22. The fingerprint sensor according to claim 21, wherein one of one of the first touch electrode strips and one of the second touch electrode strips that intersect each other is straight-strip-shaped.

* * * * *